Jan. 21, 1936.  R. L. GANGWISCH  2,028,201
BUTT WELD PIPE
Filed Sept. 11, 1935
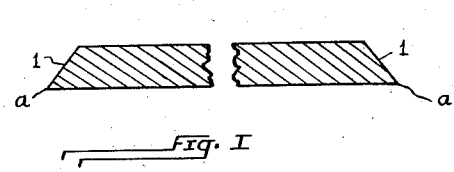
Fig. I
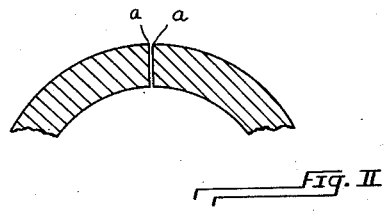
Fig. II
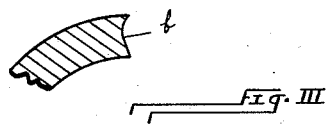
Fig. III
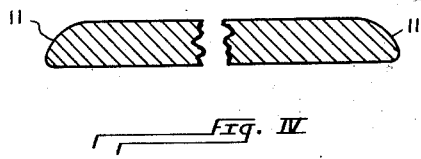
Fig. IV
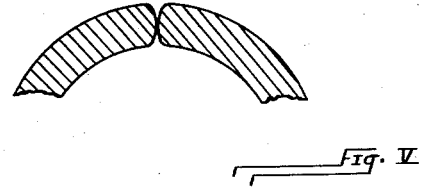
Fig. V
INVENTOR
Robert L. Gangwisch
by Christy and Wharton
his attorneys Patented Jan. 21, 1936

2,028,201

UNITED STATES PATENT OFFICE 2,028,201

BUTT-WELD PIPE

Robert L. Gangwisch, Beaver, Pa., assignor to Pittsburgh Tube Company, Pittsburgh, Pa., a corporation of Delaware Application September 11, 1935, Serial No. 40,068

2 Claims. (Cl. 205—12)

This invention relates to the production of butt-weld pipe, and consists in a particular shaping of the skelp from which the pipe is developed. In consequence of such particular shaping, a source of defect is eradicated, and a consistently better product is obtained.

In the accompanying drawing Fig. I is a fragmentary and diagrammatic view in cross-section of a length of skelp with beveled edges, such as is commonly provided for the production of butt-weld pipe; Fig. II similarly shows the edges as they approach one another as the skelp is shaped in the welding bell to tubular form; Fig. III is a fragmentary view in transverse section, illustrating diagrammatically a matter of shape in which has been found the source of a defect in pipe that has been developed after the manner indicated in Figs. I and II. These figures, I–III, are illustrative of the prior art.

Fig. IV is a view corresponding to Fig. I and Fig. V a view corresponding to Fig. II of skelp shaped according to my invention as it is provided and then worked into pipe.

Skelp is the term that designates a long narrow strip of metal, commonly of steel, which, being introduced in heated condition and powerfully drawn through a bell-shaped die (called the welding bell), is shaped to tubular form. The edges are brought to contact and compressed one upon the other within the bell, and the conditions of temperature and pressure are such that a weld union is effected and the pipe is completed.

If the edges of the skelp be plane-faced and if the faces be perpendicular to the extent of the strip, it is manifest that as in the shaping the edges are brought together a V-shaped space will be formed. This will be due to the fact that the outer circumference of the tube is of greater extent than the inner. And the greater the wall thickness, relatively to tube diameter, the wider will be the spread of the V-shaped space. In the welding of the tube the contact of the edges will begin at the inner corners and will, with displacement of metal, spread outwardly. It is a difficult matter under such conditions to produce uniformly perfect pipe. If, because of variation in minute proportions, or in composition of the metal, or because of variation in degree of heat, the pressure be too little, the V-shaped space may not be fully closed; the pipe will be marred; and the weld may not be sufficiently strong. If, on the other hand, the pressure be excessive, a protuberance may be formed in the bore of the pipe and along the line of the weld; and on such account the pipe may be inferior. As a remedy for and a preventive of such inferiority it has been common practice to form the skelp with oppositely beveled edges, as indicated at 1, Fig. I, so that one face is wider than the other, and to shape the skelp to tubular form with the wider face the outer, and so to bring the edges together in more nearly face-to-face abutment, as indicated in Fig. II. Thus welding is accomplished without great displacement of metal. It has, however, been found that pipe made from beveled-edged skelp is liable to another defect; a defect that is latent, in that it is not to be detected on mere inspection and a defect that may be very serious. In the shaping of the skelp in the welding bell, it is the acute angles ($a$, Figs. I and II) of the beveled skelp that are the outer angles. The stress within the bell tends to attenuate these angles and to give to the meeting edge surfaces a concave configuration, such as is indicated at $b$ in Fig. III. And, in the progress of shaping within the bell, scale swept from the surface of the skelp finds lodgment in the concavity. Bits of scale so lodged are entrapped between the meeting edges of the skelp. Wherever they lie, and throughout their extent, weld union is by their presence prevented. The latent defect so produced may render the pipe liable to failure; the seam may under pressure open.

I have discovered that, retaining in essence and substance the beveled edge, and substantially all the benefit and advantage that the beveled edge affords, I may, by further minute modification in shape, prevent the formation of concavity of the surfaces that meet and unite within the bell, prevent lodgment of scale upon the meeting edges, and so prevent the development of the defect whose nature and character have been explained. My invention is found in giving convexity to the beveled edges of the skelp, as indicated at 11, Fig. IV. When then the skelp is shaped within the bell, the tendency toward the formation of concavity in the edge (such as concavity $b$, Fig. III) is offset. The convexity of the edge is reduced, and may even be wholly eliminated; but concavity is not formed. There is no lodgment of scale. The edges, free of scale, meet as indicated in Fig. V, and a sound weld is formed.

I claim as my invention:

1. A skelp for butt-weld pipe having an edge that is beveled and convex, the width of one surface exceeding the width of the opposite surface in correspondence to the excess of the exterior circumference over the interior circumference of the finished pipe, and the convexity of the edge affording prevention against the development of scale-lodging concavity of the edge in the skelp-bending operation within the bell.

2. In the production of butt-weld pipe the method of procedure herein described which consists in shaping to tubular form and welding in a welding bell a skelp with oppositely beveled and convex edges and with opposite surfaces of unequal width, the wider surface of the skelp being the outer surface of the shaped article, whereby the disparity in width between the two surfaces of the skelp affords accommodation to the disparity between the inner circumference and the outer circumference of the shaped article, and the convexity of the edges is preventive of the development in the bending operation of scale-lodging concavities.

ROBERT L. GANGWISCH.